Dec. 26, 1939.    D. W. SHOOK    2,184,364
DEVICE FOR HOLDING ANIMALS WHILE UNDER TREATMENT OR OPERATIONS
Original Filed Jan. 21, 1938
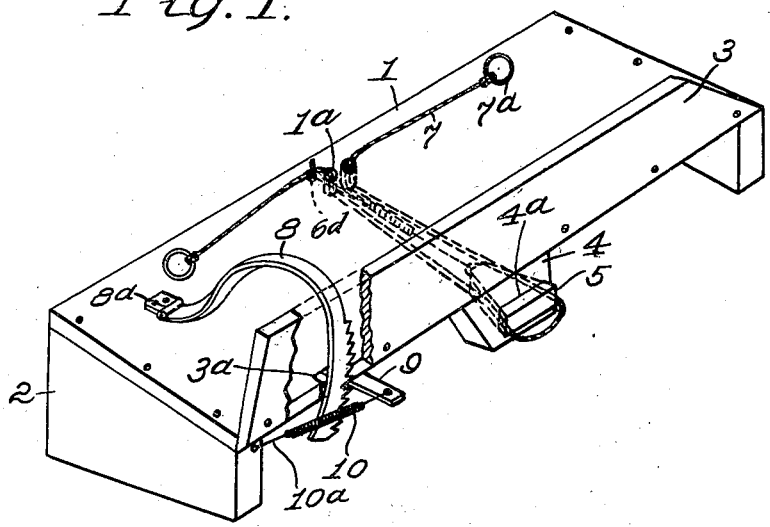
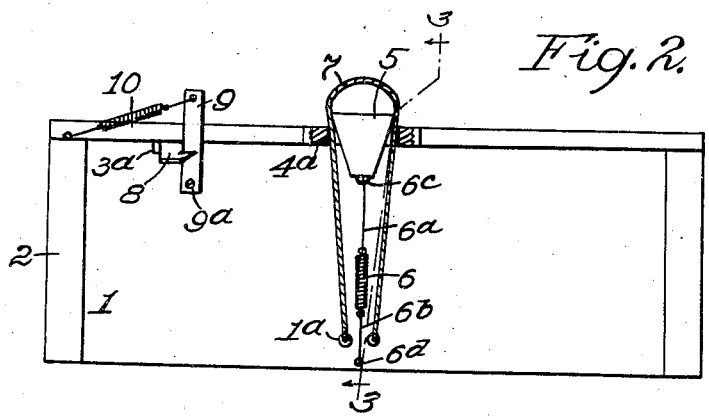
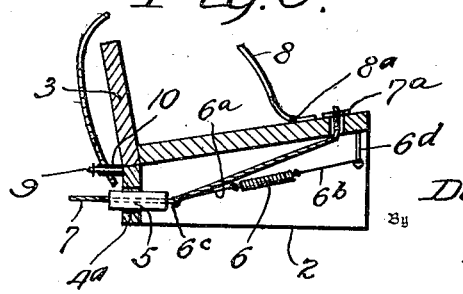
Inventor
David W. Shook,
By G. C. Kennedy
Attorney Patented Dec. 26, 1939

2,184,364

UNITED STATES PATENT OFFICE 2,184,364

DEVICE FOR HOLDING ANIMALS WHILE UNDER TREATMENT OR OPERATIONS

David W. Shook, Dayton Township, Butler County, Iowa

Application January 21, 1938, Serial No. 186,088
Renewed May 20, 1939

2 Claims. (Cl. 119—103)

My invention relates to improvements in holding animals in positions for treatment or operations, and an object of my improvements is to supply an operating stand with means for lockably releasably securing an animal thereon adjustably and conveniently.

Another object of my improvements is to furnish cooperating fastening devices for different parts of the animal when positioned on the stand.

These objects I have accomplished by the means which are hereinafter fully described, claimed and illustrated in the accompanying drawing, in which Fig. 1 is a perspective view of my complete apparatus, with a portion of the upraised lateral ledge thereof broken away. Fig. 2 is a plan view of the under face of the operating stand, with the releasable adjustable locking devices mounted thereon, and with a part broken away. Fig. 3 is a cross section of Fig. 2, taken on the broken line 3—3 in the direction indicated by the arrow.

It is to be understood that various changes may be effected in the elements of said invention, without departing from the principles and uses thereof.

The stand of this apparatus consists of a bedplate 1 of oblong shape fixed on end supports 2, with a lateral upwardly directed wall or ledge 3 fixed along one longitudinal edge of the bed-plate 1. A depending bearing-block 4 is fixed medially upon the lower edge of the ledge 3, and has a horizontal oblong aperture with parallel walls therein shown at 4a. A wedge 5 with its wider end outward from the aperture 4a is inserted therein and therethrough, and as shown in Fig. 2 a coiled tension spring 6 is at opposite ends connected by linking devices 6a and 6b to a staple 6c in the narrow end of the wedge 5 and to a pin 6d in the opposite part of the bed-plate 1.

A cord or rope 7, when the wedge 5 is partially withdrawn outwardly may be looped as shown with equal lengths thereof passed through spaces between the wedge and the outer side angles at the aperture 4a across the lower face of the platform or bed-plate 1, and thence upwardly through a pair of holes 1a to have the terminal parts above the bed-plate, and if desired may have rings 7a or other fastening means thereon to inclose or fasten to a hog's hind legs, or to members of any other animal.

I have supplied auxiliary means for receiving and clasping the neck of the animal also. Just within the ledge 3 at the left part of the bed-plate 1 the latter is apertured at 3a or rectangularly notched adjacent the ledge. A small plate 8a is fastened to the top of the bed-plate across from the aperture 3a, and a curvate arm 8 has one end hinged to the plate 8a to swing transversely, the arm being a loop opening downwardly with its termination passed downwardly through the aperture 3a to project below it, and the depending end part of the arm being toothed along its right-hand edge. A pawl 9 pivoted at 9a to the under face of the bed-plate projects across the lower edge of the ledge 3. A coiled tension spring 10 has its ends connected by links 10a respectively to the left-hand end support 2 and also to the outer end of the pawl 9, the latter being thus kept yieldingly engaged with the teeth of the arm 8 adjustably. This curvate arm may thus clamp the neck of an animal to and against the bed-plate and the ledge.

The wedge 5 serves to cramp opposite parts of the cord or rope 7 adjustingly when the spring 6 after extension draws the wedge inwardly, the sloping side walls of the wedge serving to compress the cord members between the wedge and the angles at the sides of the walls of the aperture 4a. The operator having first fastened the ends of the cord members to the hind legs of the animal at a desired spacing of them apart for an operation, such as castration or otherwise, when the wedge and cord members are in the positions shown in Fig. 2, may pull upon the medial outer loop of the cord 7 and the cord will frictionally draw out the wedge a desired distance, so that when the operator relinquishes the cord, the release of tension of the spring 6 will return the wedge to, as shown, cramp the cord members between the side walls of the wedge and the angles of the side parts aperture 4a in the ledge 3, whereby the animal's legs are held apart adjustably. When the operation is completed, the rope ends are slackened for disengagement from the animal as the draft of the cord upon the wedge when pulled out loosens the wedge.

I claim:

1. In combination, a raised platform with an upwardly extending lateral wall, and having a depending projection below the wall with an aperture having transverse parallel faces, a wedge having an outer end wider than the horizontal width of said aperture, a cord or the like having a medial part around the wider end of the wedge with its members passed through said aperture between its side walls and the sloping side walls of the wedge, and a resilient connection between the inner narrower end of the wedge and the opposite part of the platform, whereby the wedge may adjustingly clamp the cord members to said projection after the members are fastened to limbs of an animal supported upon and against the platform and its ledge.

2. In combination, a raised apertured platform with an upwardly extending lateral wall, and having a depending projection below the wall with an aperture having transverse parallel faces, a wedge having an outer end wider than the horizontal width of said aperture, a cord having a medial part around the wider end of the wedge with its members passed through said aperture between its side walls and the sloping side walls of the wedge, a resilient connection between the inner end of the wedge and the opposite part of the platform, whereby the wedge may adjustingly clamp the cord members to said projection at its side angles when the cord members traverse the platform apertures and are secured to members of an animal upon the platform, to fasten the animal to the platform, and auxiliary means for adjustably clamping the forward part of the animal upon the platform and against the lateral wall, consisting of a curvate toothed member hinged at one end to the platform, and a resiliently controlled pawl on the platform engaged with teeth of said member releasably.

DAVID W. SHOOK.